Jan. 20, 1942.  B. H. RIDDER  2,270,603
HUMIDIFICATION OF GOODS AND AIR CONDITIONING OF CONTAINERS
Filed Jan. 8, 1938
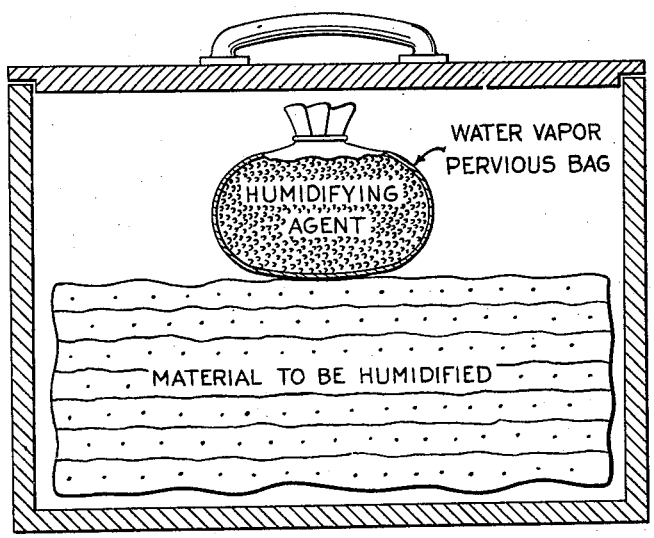
Inventor
Bernard H. Ridder
By
ATTORNEYS Patented Jan. 20, 1942

2,270,603

UNITED STATES PATENT OFFICE 2,270,603

HUMIDIFICATION OF GOODS AND AIR CONDITIONING OF CONTAINERS

Bernard H. Ridder, New York, N. Y., assignor to the firm Reddir Inc., Wilmington, Del.

Application January 8, 1938, Serial No. 184,108

1 Claim. (Cl. 252—194)

This invention relates to the conditioning of air or other gases in closed containers, and relates in particular to the accomplishment of humidity control and the maintenance of a desired relative humidity in a closed container in such a manner as to keep the objects contained therein in a desired humid condition. Such containers may be cigar or cigarette packages, bales of goods such as tobaccos, packages or boxes of photographic films or any closed spaces, whether large or small, containing any goods capable of being kept at a desired moisture content by the means disclosed herein.

The arts have striven for many years to solve the problem of maintaining the proper humidity in a container, it being understood that the relative humidity desired varies for the type of substance enclosed by the container; that is, for example, a higher degree of humidity is desired for tobaccos than is desired for photographic films, especially films containing emulsions for color photography. Prior art devices which relied upon a water-soaked sponge or other liquid soaked absorbent material were unsuccessful because they maintained a relative humidity much greater than was desired in most instances, and this resulted in a condensation of the moisture throughout the container when the temperature of the ambient medium was suddenly lowered.

It has also been suggested by the prior art to use a salt having water of crystallization such as Glauber's salt, $Na_2SO_4.10H_2O$. Glauber's salt possesses the advantage that at normal temperatures it will give up moisture so as to maintain the relative humidity in a container at a point well above normal room humidities, as approximately 88% at 75° F. Glauber's salt, however, for those purposes enumerated above is unsuccessful in practice because the salt tends to break down to $Na_2SO_4$ and gives up its water of crystallization as free water at a temperature of approximately 91° F. At this temperature the salt dissolves in the water of crystallization which is liberated, thus forming a water solution of the salt, which, of course, will destroy the taste of tobacco if the tobacco becomes wetted thereby, or will ruin the surfaces of a photographic film, and will, in general, have a deleterious effect on any packaged material with which it comes in contact. Furthermore, on a lowering of the temperature, the salt will not reconvert itself into the crystalline state with sufficient rapidity to prevent water of condensation from forming throughout the container.

The same objections are experienced with certain other salts. Borax, for example, $$Na_2B_4O_7.10H_2O$$

gives a relatively low humidity of about 60% at a temperature of about 70° F. At higher temperatures, borax causes such an increase of humidity that a sudden lowering of the temperature produces a sudden condensation of the water vapor and gives a so-called "rainstorm" within the container, which is a fatal defect as far as most goods, such as tobaccos and films, are concerned.

Attempts have been made to limit the drawbacks of these salts by packaging them with blotting paper or with their corresponding anhydrous salt, or even by mixing them with plaster of Paris. Such attempts have not been successful since the salt used for humidifying purposes, generally Glauber's salt, is not prevented from liquefying sufficiently by the previously suggested methods, and the liquefied material returns to its original form too slowly for practical purposes of humidity maintenance and control. Even when a salt having water of crystallization has been mixed with its corresponding anhydrous salt, the objectionable free liquid is not eliminated. As far as is known in prior art disclosures, mixing a salt having water of crystallization with its corresponding anhydrous salt does not result in changing the humidity which is maintained by the salt having water of crystallization alone.

It is an object of this invention to maintain the relative humidity in a container within a predetermined range by means of salts having water of crystallization affixed thereto.

A further object of the invention is to create a humidity range within a container which is the resultant of the effect produced by a mixture of a salt having water of crystallization with another substance which may or may not be another salt having water of crystallization.

Another object of the invention is to produce a predetermined humidity in a container by means of a mixture of certain proportions of a plurality of salts, at least one of which is a salt having water of crystallization, the individual salts when used alone being incapable of maintaining the desired humidity under all practical temperature ranges.

A still further object of the invention is to raise the apparent liquefaction point in certain salts having water of crystallization so that said salts are usable at all temperatures within the range of normal atmospheric temperatures, or within a desired temperature range.

Yet another object of the invention is to use certain control salts to raise the liquefaction point of a salt having water of crystallization by mixing said salts so that the resultant humidifying or drying effects of the plurality of salts can be practically utilized.

The instant invention is based upon the discovery that the effective liquefaction point of a salt having water of crystallization, such as Glauber's salt, that is to say, the point at which freed liquid will cause a wetting of unsized paper, as observable upon heating of the salt, can be raised from a relatively low to a higher temperature which, according to the preferred form of the invention, is approximately 120° F. The result is that the humidifying and/or drying power of the salt is maintained over a broad temperature range, and, furthermore, the salt is not subject to the objection of losing its water of crystallization in the form of a free liquid.

A further discovery of the instant invention is that the relative humidity can be maintained within a very small range under the action of certain control salts. Relative humidity can also be maintained within a very small range by a mixture of two salts which may or may not liquefy at normal temperatures. This mixture may comprise salts none of which liquefy at normal atmospheric temperatures, or may comprise a mixture of salts in which at least one of the salts acts to raise the liquefaction point of one or more other salts.

For purposes of describing one aspect of the instant invention, the accompanying drawing shows in section a container or box in which there is placed a material to be humidified and a receptacle which may be a moisture pervious paper bag holding the humidifying agent.

Generally, a change in the quality of a salt having water of crystallization is accomplished by mixing such a salt with a second salt having a higher liquefaction point and having the property of substantially instantaneously affixing the molecules of water of crystallization liberated by the first salt. These molecules of water may be affixed as waters of crystallization to the second salt, or may be partially held in place as a static film with no apparent or objectionable liquid resulting. Such a salt, for example, is sodium tetra borate, commercially known as partially dehydrated or dried borax $Na_2B_4O_7.5H_2O$, this being the recognized formula for this salt when it contains five waters of crystallization. An even more desirable form of the material is represented by the formula $Na_2B_4O_7.4H_2O$ which is sodium tetra borate with four waters of crystallization. Still other degrees of waters of crystallization in sodium tetra borate may exist and be useful for the purposes of this invention.

I have discovered that if two materials, such as Glauber's salt and sodium tetra-borate of a form as mentioned above, are intimately mixed together, the temperature point at which the apparent liquefaction of the Glauber's salt takes place will be raised, and the relative humidity within a container can be maintained within a predetermined range by the mixture depending upon the proportions of the Glauber's salt mixed with the sodium tetra borate. The intimate mixing may be accomplished by grinding the two salts together in a mortar so that the crystals of each are brought into a very close contact with each other. The following table gives the range of relative humidity which may be obtained by using various proportions of the two salts.

| Volume conditioned | Salt mixture | | Relative humidity range |
|---|---|---|---|
| | Glauber's salt $Na_2SO_4.10H_2O$ | Sodium tetra borate $Na_2B_4O_7.4H_2O$ | |
| Cu. in. 226 | Weight in grams 3 3 1.5 0.5 | Weight in grams 2 5 3 2.5 | 75-80 65-69 60-66 48-55 |
| | Temperature range °F 65-80 Room humidity percent 15-20 | | |

These values have been determined by means of many experiments. They illustrate that by varying the proportions of the two salts, various humidities are obtained, and that humidities, other than those shown, can be obtained by using proportions other than those listed. Obviously, for purposes of illustration it is impossible to list all the proportions that may be used. Of course, in order to regulate the humidity of the air in a container, it is necessary that the quantity of the two salts be great enough to affect the volume of air in the container, including the quantity of moisture held by the contents therein. It is obvious that in a package which contains photographic film or cigars, the amount of air is so little as to necessitate only a very small amount of the mixture. No harmful free liquid, nor any harmful "rainstorm" was experienced through the temperature range tabulated.

It is believed that operation of the mixture of the salts is as follows: Glauber's salt has ten molecules of water of crystallization, whereas the borate used has a lesser number affixed thereto, such as four or five molecules of water of crystallization, which is less than the maximum normally retained thereby, namely ten molecules of water. When equal weights, for example, of these two salts are mixed together, it is clear that there is a certain volume of water which can be given up by the Glauber's salt, which apparently can be affixed by the borate in the conversion of the borate from the tetra crystal of $4H_2O$ to the deca crystal of $10H_2O$. Inasmuch as the Glauber's salt will give off its water of crystallization at about 91° F., when the container reaches and exceeds the temperature of 91° F., the Glauber's salt gives up its molecules of water of crystallization, but does so very slowly due to the intimate mixture of the two salts.

At this temperature, however, the borate, which in the presence of moisture is converted to the deca crystal of $10H_2O$ and which does not readily lose its waters of crystallization at normal temperatures, takes on the molecules of water liberated from the Glauber's salt, converting itself immediately from the borate with four molecules of water to the borate with either five or ten molecules of water. The exchange of the molecules of water from the Glauber's salt to the borate is so rapid as not to be apparent. That is to say, the affinity of the borate for the molecules of water being great, the molecules of water become fixed to the borate substantially instantly, and even when this mixture is rapidly heated, no liquid can be observed leaving the Glauber's salt at temperatures from 91° F. to 120° F.

More particularly, the complete process taking place through a cycle of a raised and then lowered temperature is as follows: When a mixture of the Glauber's salt and the borate undergoes an increase in temperature, the Glauber's salt will give up some of its molecules of water, which molecules will become affixed as waters of crystallization to the borate. As there is no free moisture, the powder mixture remains dry. As the molecules of water released by the Glauber's salt are taken by the borate, the humidity within the container is regulated by the rate of affixation of molecules of water to the borate crystals. When the temperature of the container and the mixture is lowered, with a momentary corresponding rise in the relative humidity, the partially dehydrated Glauber's salt will immediately affix the molecules of water appearing as excess water in the air, said salt tending to return to its state of retaining ten molecules of water, and again no free water appears in the container. For all practical purposes, the rate of affixation of the water molecules to the Glauber's salt is fast enough to prevent water of condensation from forming. If the drop in temperature is accompanied by a drop in humidity, then the borate will release some of its molecules of water in order to raise the humidity. Thus the combination of the salts interact to compensate for the changes in humidity which accompany or result from changes in temperature, and a substantially constant humidity is maintained.

Consequently, the phenomenon appears that the liquefaction point of the Glauber's salt is raised far above its normal liquefaction point by means of the borate. The further phenomenon appears that the Glauber's salt in conjunction with the borate, maintains a substantially constant humidifying function over the entire range of normally prevailing temperatures, such as from 0° F. to 120° F., rather than losing it at the higher temperature, as is the case when Glauber's salt is used by itself. Furthermore, the degree of relative humidity can be maintained at less than the normal degree of humidity maintained by the Glauber's salt alone.

The discovery of the instant invention that a mixture of certain salts having water of crystallization will maintain a substantially constant humidity in a container is exemplified by the following table:

A mixture of one and one-half parts of Glauber's salt and three parts of $Na_2B_4O_7.4H_2O$ reacted as follows when heated to 76° F., cooled to 49° F., and then heated to 76° F.

| Temperature, ° F. | Relative humidity | Time |
| --- | --- | --- |
|  | Per cent |  |
| 76 | 60 | 0 |
| 68 | 56 |  |
| 49 | 60 | 37 min. |
| 49 | 60 | 0 |
| 76 | 60 | 7 hrs. |

The results as set forth in this table were obtained from a container in which the salts were enclosed by a paper cover pervious to the passage of water vapor, as will be later described.

A mixture of equal weights of magnesium sulphate, $MgSO_4.7H_2O$, and sodium tetra borate, $Na_2B_4O_7.10H_2O$, reacted when cooled from 74° F. to 36° F., and then heated to 74° F., as follows:

| Temperature, ° F. | Relative humidity | Time |
| --- | --- | --- |
| 74 | 55 | 0 |
| 65 | 55 | 5 min. |
| 58 | 55 | 10 min. |
| 42 | 59 | 35 min. |
| 36 | 59 | 70 min. |
| 36 | 59 | 125 min. |
| 74 | 55 | 12 hrs. |

Inasmuch as neither the magnesium sulphate nor the borate used in this example gives up its water of crystallization at normal atmospheric temperatures so as to give off free liquid as does Glauber's salt, this table further illustrates how humidity control can be obtained without bothering about the raising of the liquefaction point of one of the materials.

No water of condensation was apparent in the above experiments. This is an important feature of this invention since heretofore the use of salts or other substances for humidifying containers has been impractical partly because an increasing temperature followed by cooling resulted in the materials first giving up water very rapidly at the higher temperature, and then, on cooling, condensing the water on the surface of the articles being humidified, and thus spoiling the appearance or quality of said articles. Therefore, it can readily be seen that an important contribution has been made in the art by the discovery of a mixture which maintains a satisfactory humidity within a closed container, and at the same time eliminates the appearance of an excessive amount of water vapor under abnormal conditions and consequently prevents the appearance of condensate on the humidified articles.

Various compositions of salts will give other humidities which may be determined, and used to maintain a substantially constant relative humidity in a container. For example, the following table gives the mix and the humidity of various salt combinations:

| Mixture | Humidity |
| --- | --- |
|  | Percent |
| 3 parts $MgSO_4.7H_2O$ | |
| 3 parts $Na_2B_4O_7.10H_2O$ | 60 to 70 |
| 1 part $Na_2B_4O_7.4H_2O$ | |
| 3 parts $MgSO_4.7H_2O$ | |
| ½ part $Na_2SO_4.10H_2O$ | 48 to 55 |
| 2½ parts $Na_2B_4O_7.4H_2O$ | |

Accordingly, the difficulties encountered by the prior art in the maintainence of a relative humidity because of the difficulty of maintaining the stability of the materials has been solved by the materials of the instant invention. For example, many tobacco manufacturers prefer to pack and distribute their cigars in such a manner that will permit of their being retailed from a box in which the relative humidity has been maintained at about 65 to 67%. A mixture of three parts of Glauber's salt with five parts of the sodium tetra borate $4H_2O$ will maintain the humidity in the box of cigars at about 65 to 70%. If the temperature of the ambient medium is raised or lowered from the normal room temperature, the humidity within the container is maintained at substantially its predetermined value because the salt mix regulates the humidity at temperatures including those higher or lower than normal temperatures.

An advantage of the present invention is that even when the container enclosing the humidified article is frequently opened and closed for dispensing said article, the humidity within the container will be re-established by the salt mix after each closure at least within the normal life of the package or container. Furthermore, the salt mixture will regulate the humidity within the container so that abnormal humidity in or nearby the container will not have a deleterious influence on the articles in the container. Thus the articles within the container will be maintained in a satisfactory condition regardless of the fluctuations of humidities in the region where the container is stored or displayed. Therefore, it becomes apparent that by a "closed" container is meant an enclosure that will allow the action of the mixture upon the contents in the container, and that the container need not be hermetically sealed.

Inasmuch as the mixture does not become liquid at normal temperatures, it can be conveniently placed in a paper container, the paper being pervious to the passage of water vapor, but impervious to the passage of the salt particles or dust. Any other type of material pervious to water vapor and impervious to salt dust obviously could be used instead of paper. This package can be placed in a container, such as a cigar box, a cigarette package, or a package containining photographic film, and the relative humidity in that container will be maintained substantially constant, regardless of the temperature of the ambient medium. It also may be pointed out that it is essential in boxes enclosing cigars that there be some air circulation around the cigars so that the same may "breathe." Because of the exchange of molecules of water between the salts either one way or the other, this circulating air may be properly humidified at all times, regardless of normal temperatures, and thus the tobacco kept in proper moisture condition without fear of mildew or without the fear that the tobacco will dry and lose the fragrant volatile oils therein. Similarly, if the container should enclose a photographic film, the dryness or dampness of the film can be regulated by conditioning the air within the container by means of the mixture of borate salt with other salts. Obviously, many other uses of these materials exist, inasmuch as it is apparent that wherever the relative humidity in a container shall be kept at a substantially constant value, the same can be accomplished by using a mixture of salts according to the discoveries set forth herein.

Further features of the instant invention lie in the fact that the paper, or other vapor pervious cover, will prevent the circulating water vapor from carrying fine particles of the salts throughout the container so as to create an alkaline condition in the contents. However, it is a part of the teachings of this invention to create either an alkaline or an acid condition, if either should be desired, within the container by impregnating the paper, or other pervious cover, with either an alkaline or an acid solution, which solution will make the neutral water vapor either alkaline or acid as it passes through the cover. For example, when the paper is saturated with boric acid, it has been demonstrated that the water vapor will be acidified and will cause an acid reaction in the container. Normally, a neutral condition is desired, and such is successfully obtained by the untreated cover.

Again, the type of mixture may be changed so as to compensate for seasonal variations in atmospheric humidity as found in one locality, or for prevailing humidities which may be found in different parts of the world. Clearly, a drying mixture is desirable in humid tropical regions, and a moisture giving mixture is desirable for hot, dry regions. Manufacturers of packaged goods can readily incorporate proper mixtures of the regulating salts into the packages, depending upon the prevailing humidity of the region where the goods are to be marketed or stored.

The discoveries of the instant invention are applicable wherever an enclosure exists in which the amount of air or gas enclosed can be affected by the quantity of salts placed therein. Thus a package of salts placed in the interior of a bale of tobacco will control the humidity of the bale, and a plurality of bales will humidify a warehouse, or the hold of a ship. Similarly, other goods, too numerous to be mentioned, can be properly humidified without injuring the same. For commercial purposes the life of the humidifying action is practically sufficient, that is between the packaging and marketing of goods, the humidifying action will take place.

The mixing of the salts and/or substances together as referred to throughout this specification of the invention means such a mixing as will enable the salts and/or substances to interact with each other. Preferably, though not necessarily, the salts are reduced to as near powdered form as possible with their crystalline state of having waters of crystallization retained. The finer the particles, the more intimate the mixture, and accordingly, the greater the interaction between the salts and/or substances. Very favorable and satisfactory results have been obtained by mixing the salts in a hand mortar, as previously described. However, the disclosure of this invention contemplates any mixing of the various salts and/or substances by reason of which the objects of this invention are obtained.

It is therefore obvious that the invention sets forth a great advantage in effecting humidity control within containers for articles found in the various arts.

Inasmuch as I have now disclosed means by which I obtain the objects of my invention, what I claim is:

A composition for use in humidifying the air in a closed container comprising substantially completely hydrated Glauber's salt which has water of crystallization and a relatively low liquefaction point, intimately mixed with partially hydrated sodium tetra borate having less than ten molecules of water affixed thereto and which has a relatively high liquefaction point, said salt and borate being proportioned in such quantities that the total amount of water that may be liberated from the Glauber's salt is less than the total amount of water necessary to raise said borate to a ten water molecule salt.

BERNARD H. RIDDER.